United States Patent
Nakayama

(10) Patent No.: US 11,940,330 B2
(45) Date of Patent: Mar. 26, 2024

(54) TEMPERATURE SENSOR AND COOKING APPLIANCE

(71) Applicant: SHIBAURA ELECTRONICS CO., LTD., Saitama (JP)

(72) Inventor: Noriyuki Nakayama, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 653 days.

(21) Appl. No.: 16/973,570

(22) PCT Filed: Jun. 15, 2018

(86) PCT No.: PCT/JP2018/022915
§ 371 (c)(1),
(2) Date: Dec. 9, 2020

(87) PCT Pub. No.: WO2019/239579
PCT Pub. Date: Dec. 19, 2019

(65) Prior Publication Data
US 2021/0247238 A1    Aug. 12, 2021

(51) Int. Cl.
| | | |
|---|---|---|
| *G01K 1/14* | (2021.01) | |
| *F24C 15/10* | (2006.01) | |
| *G01K 7/22* | (2006.01) | |

(52) U.S. Cl.
CPC ............ *G01K 1/146* (2013.01); *F24C 15/107* (2013.01); *G01K 7/22* (2013.01); *G01K 2207/00* (2013.01)

(58) Field of Classification Search
CPC ....... G01K 1/146; G01K 7/22; G01K 2207/00
USPC ........................................................ 374/208
See application file for complete search history.

(56) References Cited

U.S. PATENT DOCUMENTS 4,770,545 A * 9/1988 Takada ................... G01K 1/146
374/185

FOREIGN PATENT DOCUMENTS

| CN | 111307333 A | * | 6/2020 |
|---|---|---|---|
| JP | H10-170350 A | | 6/1998 |
| JP | 2000-171308 A | | 6/2000 |
| JP | 2004053373 A | * | 2/2004 |
| JP | 2006-34783 A | | 2/2006 |

(Continued)

OTHER PUBLICATIONS

Translation of JPH10170350A ; Jun. 26, 1998.*

(Continued)

*Primary Examiner* — Mirellys Jagan
(74) *Attorney, Agent, or Firm* — Osha Bergman Watanabe & Burton LLP

(57) ABSTRACT

A temperature sensor includes: a sensor element including a heat-sensitive body configured to contact with a detection object, a pair of lead wires connected with the heat-sensitive body, and connecting wires connected with the lead wires respectively; and a holding element including a fixed body configured such that a position of the fixed body is fixed to an object appliance, and a movable body configured to support the heat-sensitive body of the sensor element and to reciprocate between a first position and a second position relative to the fixed body. Each of the lead wires includes a first core wire formed of a solid wire. Each of the connecting wires includes a second core wire formed of a twisted wire and a second insulating covering that covers the second core wire. A conducting wire constituting the twisted wire has a smaller wire diameter than the solid wire.

15 Claims, 8 Drawing Sheets

(56) References Cited

FOREIGN PATENT DOCUMENTS

| | | |
|---|---|---|
| JP | 4451260 B2 | 4/2010 |
| JP | 2012-154572 A | 8/2012 |
| JP | 2017-158309 A | 9/2017 |
| KR | 20160018370 A * | 7/2015 |
| WO | WO-2020121392 A1 * | 6/2020 ............ A47J 27/004 |

OTHER PUBLICATIONS

International Search Report issued in corresponding International Application No. PCT/JP2018/022915 dated Sep. 11, 2018 (3 pages).
Extended European Search Report issued in corresponding European Application No. 18922221.9 dated Nov. 3, 2021 (7 pages).

* cited by examiner

FIG. 1A
FIG. 1B
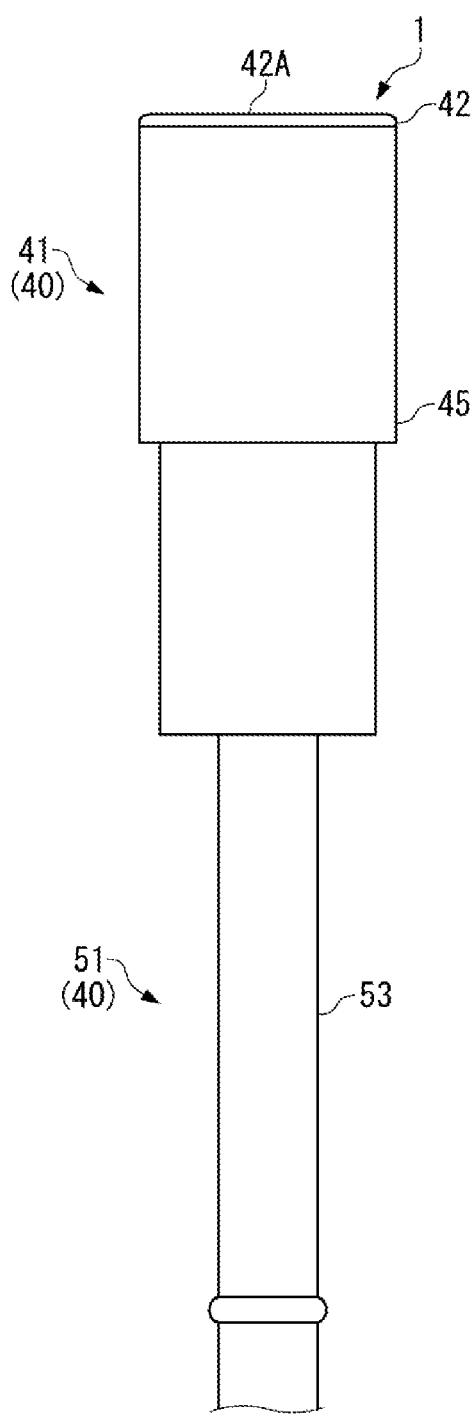
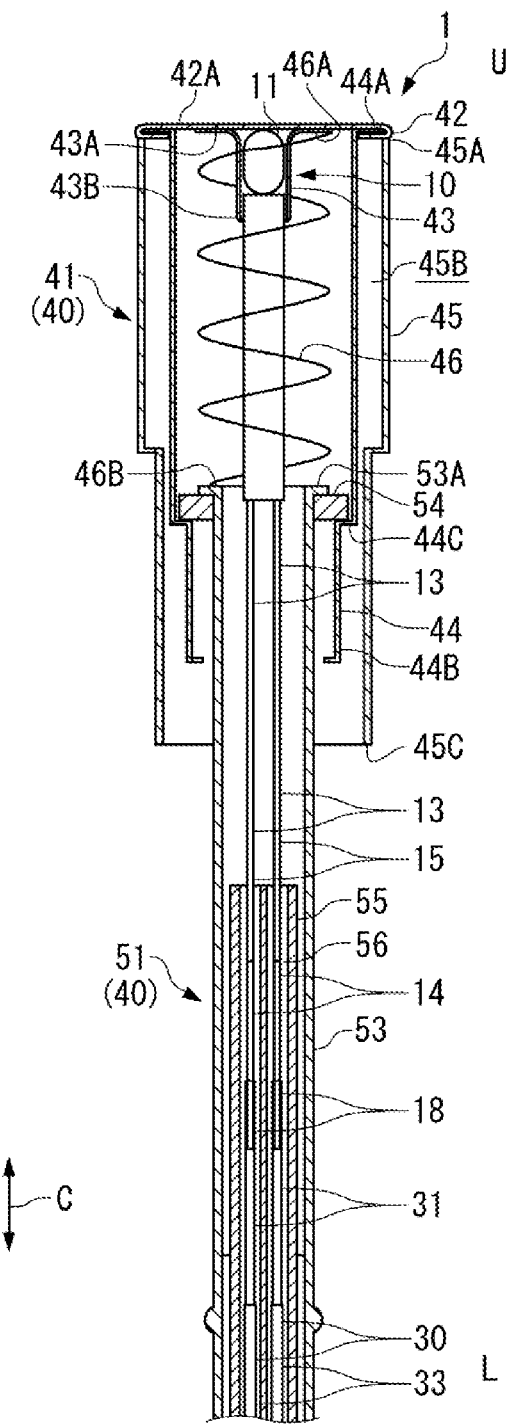

FIG. 2A
FIG. 2B
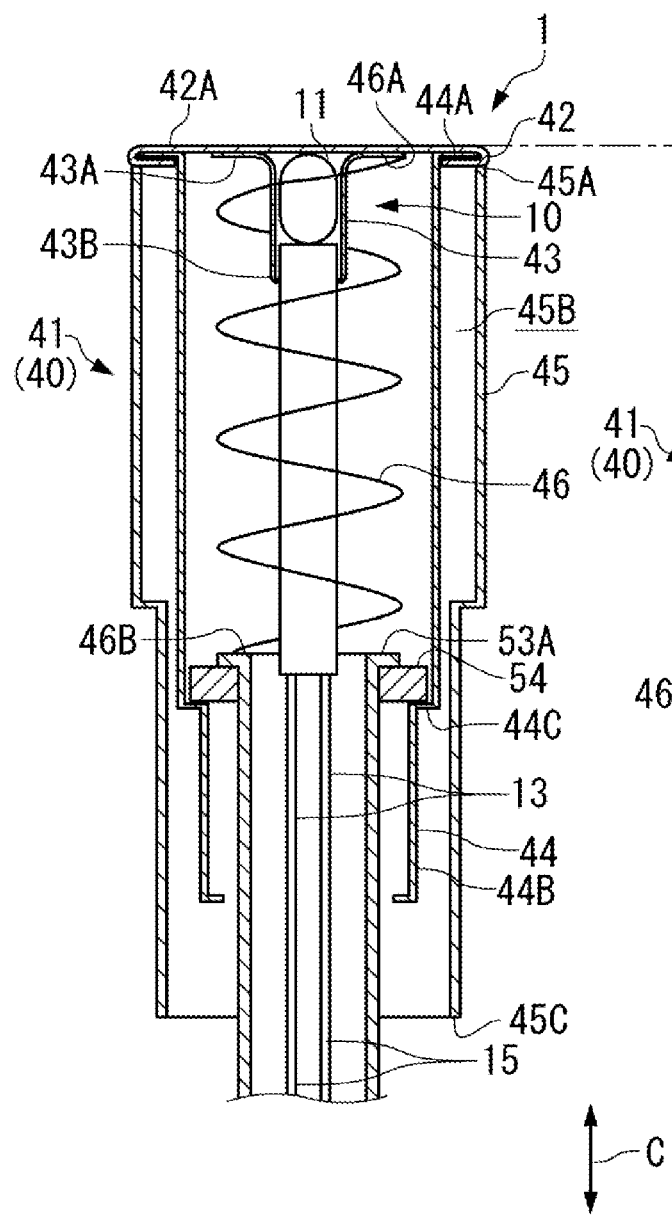
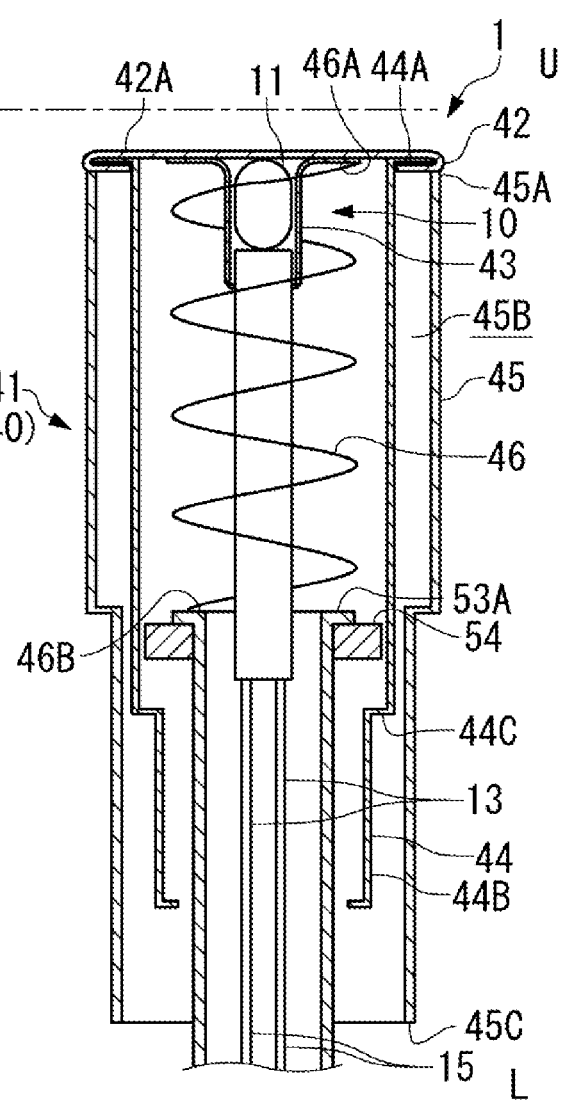

FIG. 3A
FIG. 3B
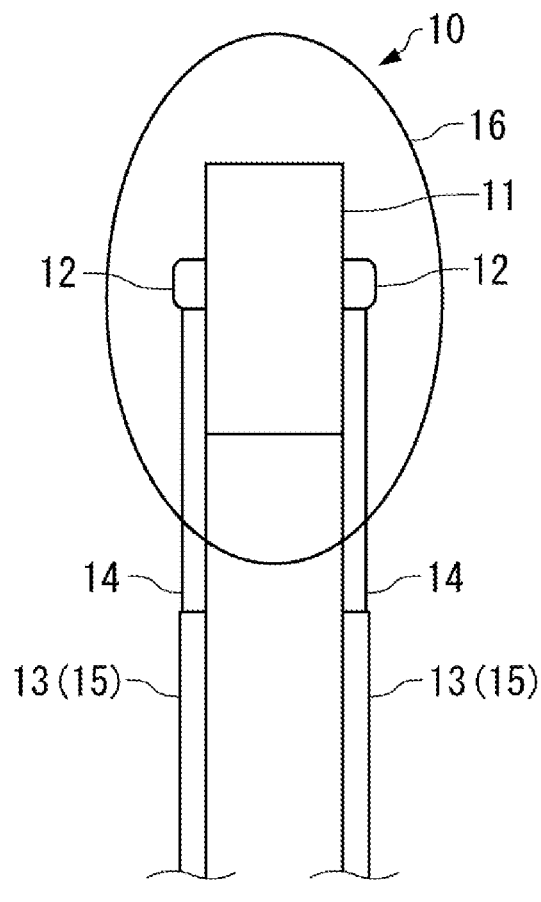
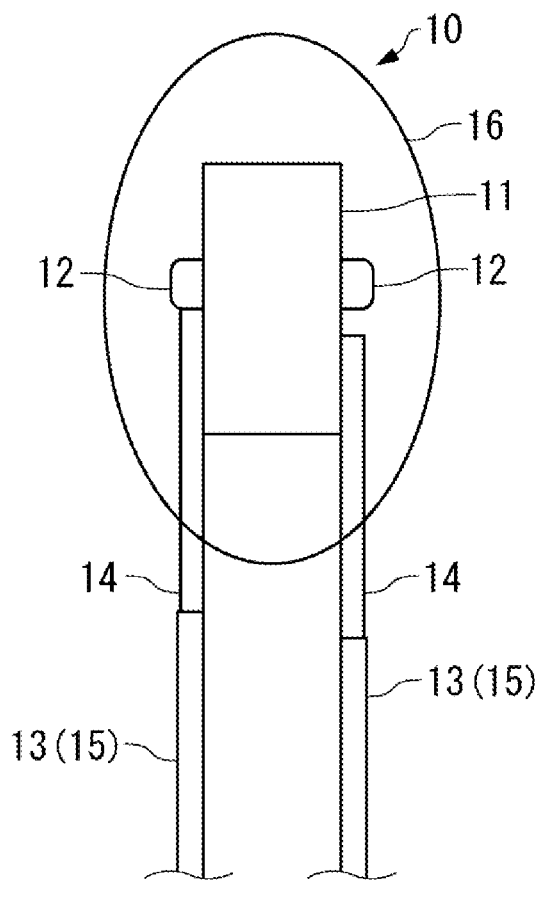
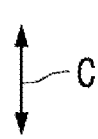

FIG. 4A
FIG. 4B
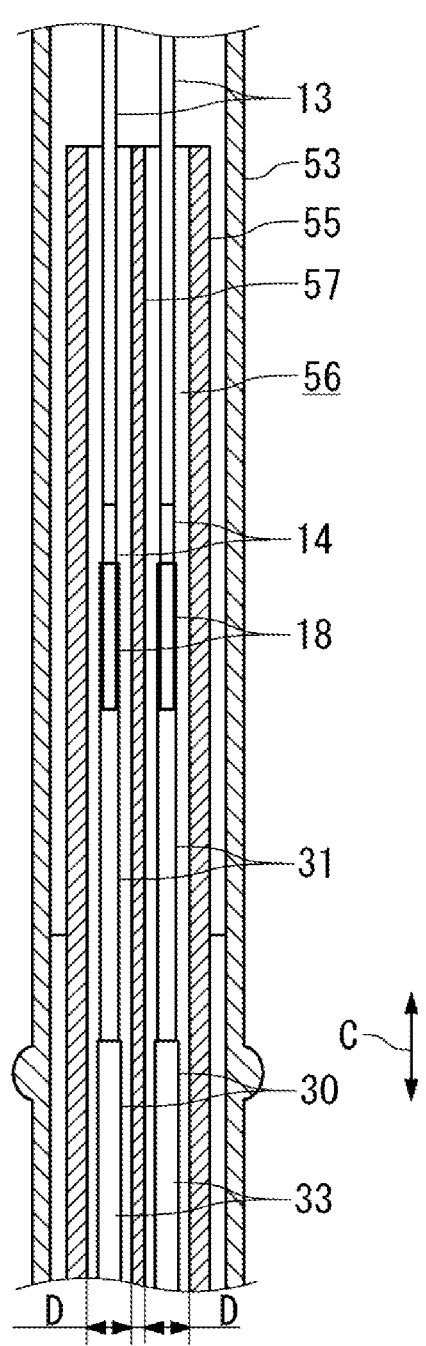
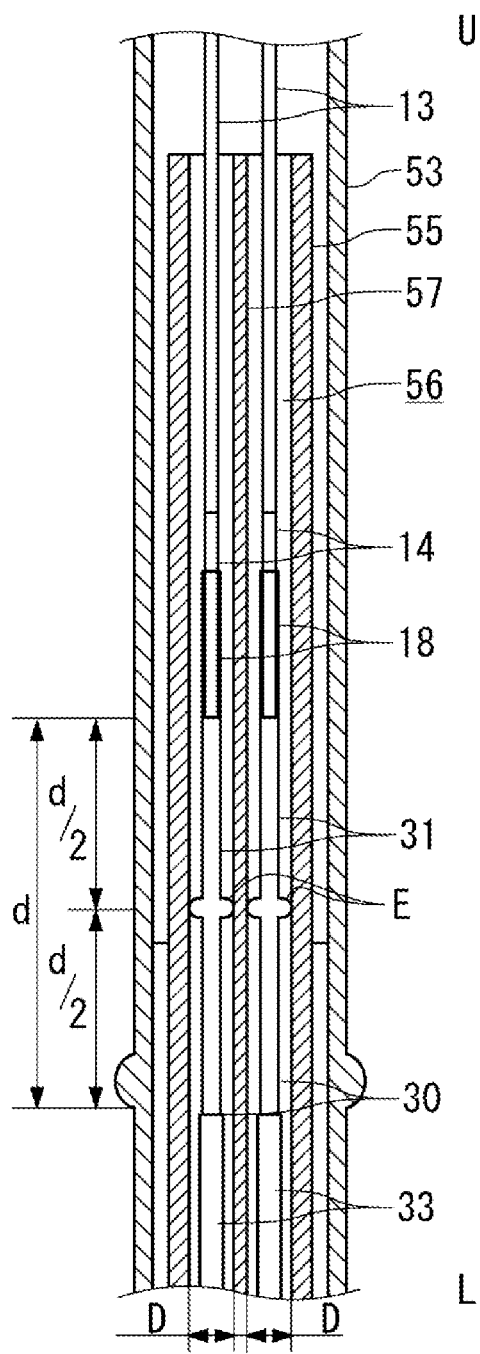

FIG. 6A
FIG. 6B
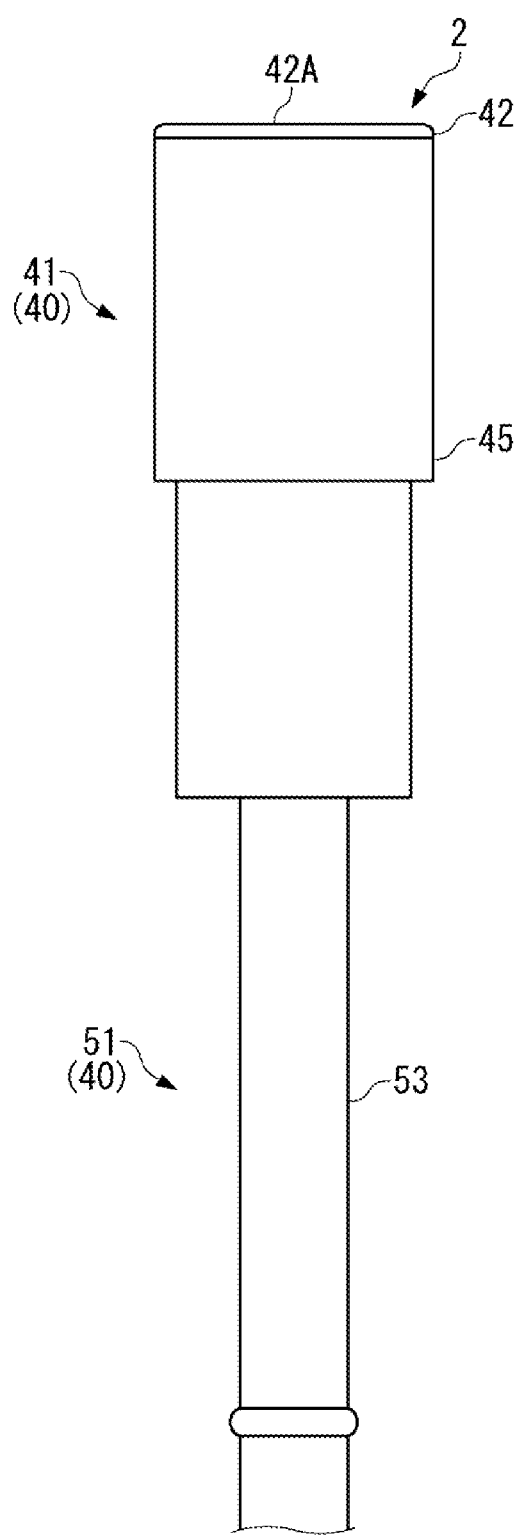
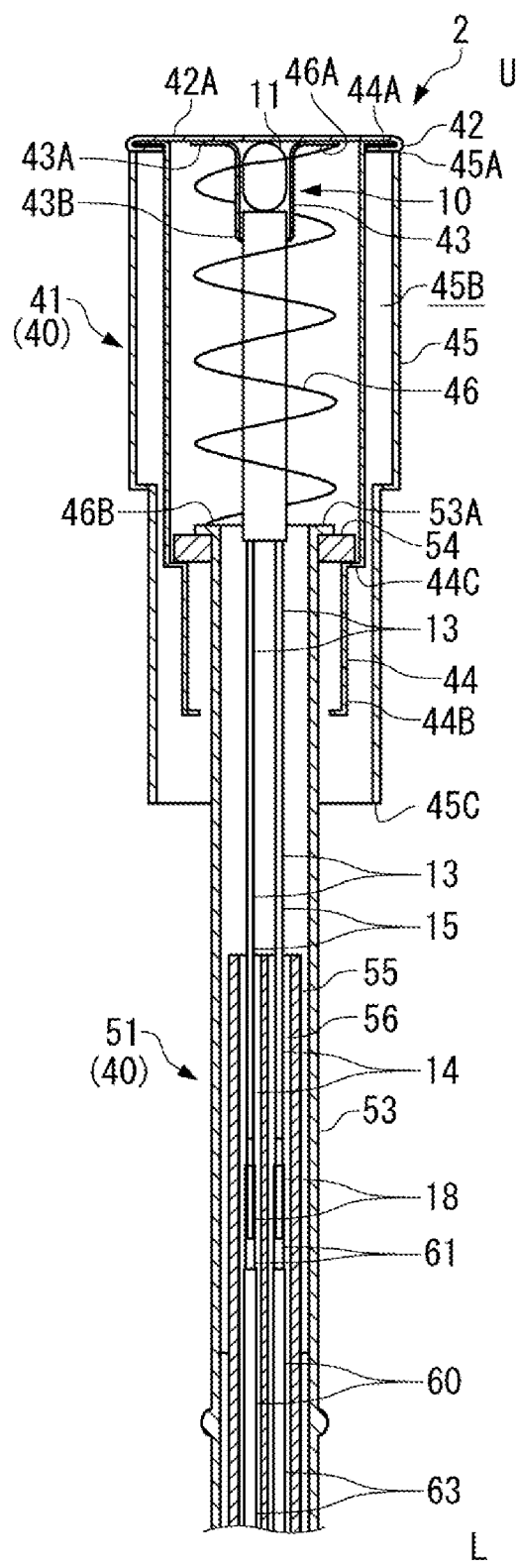

TEMPERATURE SENSOR AND COOKING APPLIANCE

TECHNICAL FIELD

The present invention relates to a temperature sensor including a movable body for maintaining the contact state with a detection object, and relates to, as an example, a temperature sensor to contact with a bottom surface of a cookware that is heated and to measure the temperature of the cookware.

BACKGROUND ART

As described in Patent Literature 1 and Patent Literature 2, for example, temperature sensors, which are brought into contact with a bottom surface of a cookware such as a saucepan and a frying pan, for example, to measure the temperature thereof, are provided with a heat collecting body to contact with the bottom surface of the cookware so as to be capable of reciprocating in the up-down direction, and elastic force is applied to the heat collecting body upward by a coil spring. As a heat-sensitive element, for example, a thermistor element is provided in contact with or close to the heat collecting body, and detects the temperature of the cookware by receiving the heat transferred from the heat collecting body. The thermistor element herein includes a thermistor as a heat-sensitive body and lead wires electrically connected with the thermistor.

The temperature sensor is provided on a cooking appliance, for example, a gas stove, and in the process of placing the cookware on a trivet of the stove, the cookware comes into contact with the heat collecting body, so that the heat collecting body is pressed down. Since the elastic force is applied to the heat collecting body upward, the contact state with the cookware is maintained by the elastic force during cooking. When the cookware is lifted from the trivet after the finish of the cooking, the heat collecting body is pressed up by the elastic force, to the initial position. In this way, this kind of temperature sensor includes a movable body to reciprocate, such as the heat collecting body.

CITATION LIST

Patent Literature

Patent Literature 1: JP 2006-34783 A
Patent Literature 2: JP 4451260 B2

SUMMARY OF INVENTION

Technical Problem

When the heat collecting body is pressed down by the cookware, the heat collecting body receives load. The load is transferred to the heat-sensitive element through the heat collecting body, and therefore, compressive load is applied to a joining portion between the heat-sensitive body and the lead wire. Further, when the cookware is lifted from the trivet, the heat collecting body is pressed up by the elastic force, and on this occasion, tensile load is applied to the joining portion between the heat-sensitive body and the lead wire. Either the cookware being brought into contact with the heat collecting body as an impact load or repetitive compressive and tensile loads over a long period may cause disconnection at the joining portion between the heat-sensitive body and the lead wire.

Hence, an object of the present invention is to provide a temperature sensor that can maintain the connection state between the heat-sensitive body and the lead wire even when the heat collecting body receives the impact load or is used over a long period.

Solution to Problem

The inventors have studied the influence of the load to the heat collecting body on the disconnection at the joining portion between the heat-sensitive body and the lead wire, and as a result, the following knowledge has been obtained.

When the cookware comes into contact with the heat collecting body or the cookware is lifted, the heat collecting body receives the load. The load is transferred to the heat-sensitive body and the lead wire, and further is transferred also to a connecting wire connected with the lead wire. The load received by the heat collection body can be relaxed at a portion of these electrical wires whose total extension is longer compared to the heat-sensitive element. However, although the relaxation of the load by the electrical wires is established if the load is gentle, the relaxation is not established and the impact load received by the heat collecting body is solely applied to the portion of the heat-sensitive element if the impact load is rapidly applied. As a result, the force is applied such that a relative positional displacement between the heat-sensitive body and the lead wire occurs, and the disconnection sometimes occurs.

A temperature sensor in the invention of the application made in view of the above knowledge includes: a sensor element including a heat-sensitive body configured to contact with a detection object, a pair of lead wires connected with the heat-sensitive body, and connecting wires connected with the lead wires respectively; and a holding element including a fixed body configured such that a position of the fixed body is fixed to an object appliance, and a movable body configured to support the heat-sensitive body of the sensor element and to reciprocate between a first position and a second position relative to the fixed body.

Each of the lead wires in the present invention includes a first core wire formed of a solid wire. Each of the connecting wires in the present invention includes a second core wire formed of a twisted wire and a second insulating covering that covers the second core wire.

The temperature sensor in the present invention is characterized in that a conducting wire constituting the twisted wire has a smaller wire diameter than the solid wire.

In the temperature sensor in the present invention, preferably, the second core wire of each of the connecting wires includes a deformable region having a strength lower than that of the first core wire of each of the lead wires.

Preferably, each of the lead wires and each of the connecting wires in the temperature sensor in the present invention is connected through a connection portion between a first exposed part where the first core wire is bared and a second exposed part where the second core wire is bared, and the deformable region is included in the second exposed part.

Preferably, a first mode of the present invention in which the deformable region is included in the second exposed part includes a deformation restricting element configured to restrict a deformation amount of the second core wire and composed of an electrical insulating material.

Preferably, the deformation restricting element in the present invention covers the first exposed part, the connection portion and the second exposed part from a periphery with a predetermined gap.

Preferably, each of the lead wires and each of the connecting wires in the present invention is connected through a connection portion between a first exposed part where the first core wire is bared and a second exposed part where the second core wire is bared, and the deformable region is included in the second core wire covered with the second insulating covering.

In a second mode of the present invention in which the deformable region is included in the second core wire covered with the second insulating covering, preferably, in each of the connecting wires, the second core wire and the second insulating covering are in contact with each other, such that a relative movement in an axis direction can be performed. In the second mode of the present invention, the second insulating covering serves also as the deformation restricting element Typically, the temperature sensor in the present invention includes an elastic body configured to apply elastic force to the movable body toward the first position.

Advantageous Effects of Invention

In the temperature sensor according to the present invention, since the connecting wire includes the second core wire formed of the twisted wire and the second insulating covering that covers the second core wire and the conducting wire constituting the twisted wire has a smaller wire diameter than the solid wire, the second core wire has a lower strength than the first core wire. Thereby, even when the heat collecting body receives the impact load, the core wire can elastically deform antecedently. Therefore, the temperature sensor according to the invention of the application makes it possible to prevent the disconnection of the core wire from the heat-sensitive body, even when the impact load is received.

BRIEF DESCRIPTION OF DRAWINGS

FIG. 1A and FIG. 1B each show a temperature sensor according to a first embodiment of the present invention, FIG. 1A being a lateral view, and FIG. 1B being a longitudinal sectional view;

FIG. 2A and FIG. 2B each show a motion of a movable body of the temperature sensor according to the first embodiment, FIG. 2A showing a no-load state where no cookware has been placed, and FIG. 2B showing a state where the movable body has been retracted because a cookware has been placed;

FIG. 3A and FIG. 3B each show a heat-sensitive element of the temperature sensor according to the first embodiment, FIG. 3A showing a normal state, and FIG. 3B showing a state where disconnection has occurred;

FIG. 4A and FIG. 4B are longitudinal sectional views showing a motion of the vicinity of joining portions between lead wires and connecting wires of the temperature sensor according to the first embodiment, FIG. 4A showing the no-load state where no cookware has been placed, and FIG. 4B showing a state where impact load has been applied when the cookware has been placed on a cooking appliance;

FIG. 6A and FIG. 6B each show a temperature sensor according to a second embodiment of the present invention, FIG. 6A being a lateral view, and FIG. 6B being a longitudinal sectional view;

DESCRIPTION OF EMBODIMENTS

Hereinafter, the present invention will be described based on embodiments. In the following, two embodiments: a first embodiment and a second embodiment will be described in turn. In the first embodiment and the second embodiment, when impact load is applied to a heat collecting body, a core wire of a connection electrical wire connected with a lead wire of a heat-sensitive element elastically deforms, and thereby, the applied load is relaxed. A portion where the core wire elastically deforms has a lower strength than the lead wire. Therefore, the core wire elastically deforms antecedent to the disconnection of the lead wire from a heat-sensitive body, and thereby, the connection state between the heat-sensitive body and the lead wire is maintained.

The first embodiment and the second embodiment are the same in that both relax the impact load by the elastic deformation of the core wire of the connection electrical wire. However, the first embodiment causes the elastic deformation of a core wire that is bared, while the second embodiment causes the elastic deformation of a core wire that is covered with an insulating covering. Further, it can be said that the elastic deformation in the first embodiment locally occurs similarly to so-called buckling, while the elastic deformation in the second embodiment meanders in a wider range compared to the first embodiment.

First Embodiment

The first embodiment of the present invention will be described with reference to FIGS. 1A to 4B and FIG. 8. In the following description, the upper side in each figure is regarded as an upward side U or a forward side, and the lower side is regarded as a downward side L or a rearward side.

Figure 8:
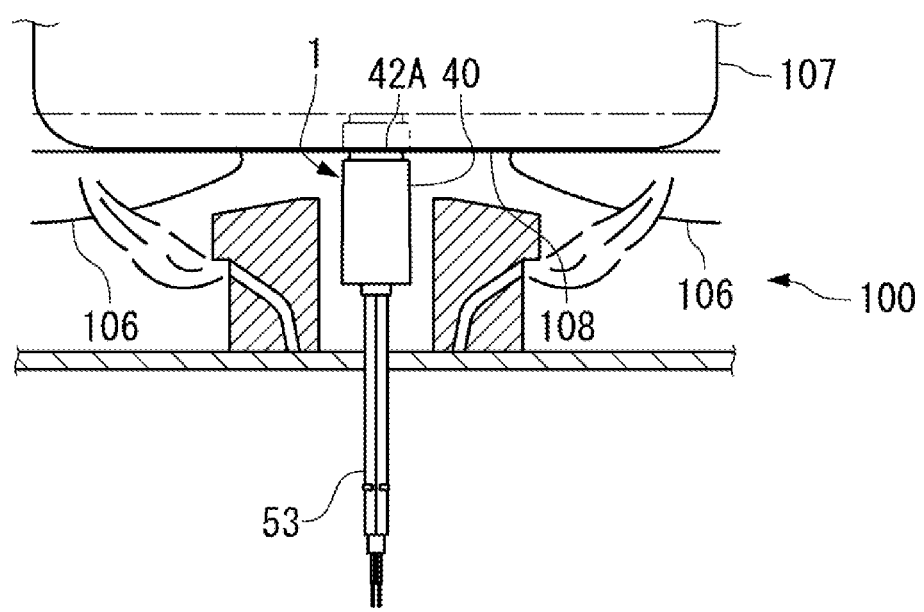
FIG. 8 is a diagram showing a principal part of a gas stove including the temperature sensor according to the embodiment.

As shown in FIG. 8, as an example, in a cooking appliance 100 such as a gas stove, the temperature sensor 1 contacts with a bottom surface 108 of a cookware 107 such as a saucepan and detects the temperature. The temperature sensor 1 is provided at a center between trivets 106, 106 on which the cookware 107 is placed, or at a position close thereto.

As shown in FIG. 1A, FIG. 1B, FIG. 2A and FIG. 2B, the temperature sensor 1 includes a heat-sensitive element 10 that is a main element for temperature detection, connecting wires 30 that are electrically connected with lead wires 13 of the heat-sensitive element 10, and a sensor holding body 40 that holds the heat-sensitive element 10.

[Heat-Sensitive Element 10]

As shown in FIG. 3A, the heat-sensitive element 10 includes a heat-sensitive body 11, electrodes 12, 12 that are formed on two facing surfaces (right and left in the figure) of the heat-sensitive body 11 respectively, a pair of lead wires 13, 13 that are electrically connected with the heat-sensitive body 11 through the electrodes 12, 12, and a protective layer 16 that seals the heat-sensitive body 11.

For the heat-sensitive body 11, a metal oxide or metal having the property that the electrical resistance value changes with temperature change is used. A constant electrical current flows through the heat-sensitive body 11 via the pair of lead wires 13, 13, the voltage between the electrodes 12, 12 of the heat-sensitive body 11 is measured by a measuring device, the resistance value is evaluated from Ohm's law (E=IR), and the temperature is detected.

As the metal oxide, a thermistor (Thermally Sensitive Resistor) is suitably used, and typically, an NTC thermistor (Negative Temperature Coefficient Thermistor) having a negative temperature coefficient is used. As the metal, a platinum (for example, Pt100: JIS-C1604) is suitably used.

The electrode 12 electrically connects the heat-sensitive body 11 and the lead wire 13, and preferably is composed of a noble metal such as gold and platinum.

The lead wire 13 is a conducting wire via which the constant electrical current flows through the heat-sensitive body 11, and includes a core wire 14 and an insulating covering 15 covering the core wire 14 as shown in FIG. 1A, FIG. 1B, FIG. 2A and FIG. 2B. For the core wire 14, a metal material having a high electrical conductivity, typically, copper is used. A core wire 31 of the connecting wire 30 described later is composed of the same metal material. The core wire 14 corresponds to the first core wire in the invention of the application. The core wire 14 of the lead wire 13 is formed of a solid wire.

In the case where glass is used as the protective layer 16, a Dumet wire is suitably used for the core wire 14. The Dumet wire is a composite wire in which an inner layer composed of an iron-nickel alloy is clad in an outer layer composed of copper. The linear expansion coefficient of the iron-nickel alloy composing the inner layer is close to that of glass. Therefore, even in the case where the protective layer 16 is composed of glass, the breakage of the protective layer 16 due to the thermal expansion of the core wire 14 is inhibited by the use of the Dumet wire.

The insulating covering 15 covers the outer circumference surface of the core wire 14.

The lead wire 13 has the same role as the connecting wire 30 described later, as an electrical wire via which the constant electrical current flows through the heat-sensitive body 11. An electrical wire directly connected with the heat-sensitive body 11 is referred to as the lead wire 13, and an electrical wire indirectly connected with the heat-sensitive body 11 through the lead wire 13 is distinctively referred to as the connecting wire 30.

The protective layer 16 is provided for avoiding the occurrence of the chemical change and physical change in the heat-sensitive body 11 by sealing the heat-sensitive body 11 and maintaining the airtight state. As the protective layer 16, it is preferable that glass be used, but a resin material can be used depending on the environment in which the temperature sensor 1 is used.

[Connecting Wire 30]

The connecting wire 30 is an electrical wire for electrically connecting the heat-sensitive element 10 and an unillustrated electrical circuit and the like at the rear, and includes the core wire 31 and an insulating covering 33 covering the core wire 31.

The core wire 31 is a twisted wire made by twisting a plurality of conducting wires, for example, 7 or 12 conducting wires. Each conducting wire constituting the twisted wire has a smaller wire diameter than the core wire 14 of the lead wire 13. As an example, the diameter of the core wire 14 is 0.3 mm, while the diameter of the conducting wire constituting the core wire 31 is 0.1 mm.

The core wire 31 corresponds to the second core wire in the invention of the application, and the insulating covering 33 corresponds to the second insulating covering in the invention of the application.

The connecting wire 30 in the first embodiment is made by an extrusion method, and is different in manufacturing method from a connecting wire 30 in the second embodiment. In the connecting wire 30 made by the extrusion method, since the insulating covering 33 melts in the making process, the melted insulating material enters irregularities on the outer circumference of the core wire 31, as shown in FIG. 7D. Therefore, in the connecting wire 30, the positional displacement of the insulating covering 33 relative to the core wire 31 in the axis direction does not occur easily.

[Joining Portion 18 Between Lead Wire 13 and Connecting Wire 30]

Next, the periphery of connection portions 18 between the lead wires 13 and the connecting wires 30 will be described with reference to FIG. 4A, FIG. 4B and FIG. 5.

The core wire 14 of the lead wire 13 and the core wire 31 of the connecting wire 30 are electrically connected through the connection portion 18, for example, by welding. Hereinafter, the description will be sometimes made based on the definition that the heat-sensitive body 11 side of the connection portion 18 is the front side and the opposite side is the rear side.

In a predetermined front-rear range containing the connection portion 18, the insulating covering 15 of the lead wire 13 and the insulating covering 33 of the connecting wire 30 are removed. That is, in the predetermined range, the core wire 14 and the core wire 31 are bared. The axis-directional size of the bared portion in the predetermined range is set to a sufficient length for relaxing the impact load when the impact load is received. This will be described later in detail.

[Sensor Holding Body 40]

Next, as shown in FIG. 1A, FIG. 1B, FIG. 2A and FIG. 2B, the sensor holding body 40 includes a movable body 41 provided so as to be capable of retracting to the downward side L when abutting on the bottom surface 108 of the cookware 107 as shown in FIG. 8, and a fixed body 51 supporting the movable body 41. The sensor holding body 40 corresponds to the holding element in the invention of the application.

[Movable Body 41]

For example, as shown in FIG. 1A, FIG. 1B, FIG. 2A and FIG. 2B, the movable body 41 includes a plate-shaped heat collecting body 42 whose front surface abuts on the bottom surface 108 of the cookware 107, a containing pipe 43 provided on the back surface side of the heat collecting body 42 and containing and holding the heat-sensitive body 11, a pipe-like holder 44 supporting the heat collecting body 42 at an upper end part, and a pipe-like cover 45 covering the holder 44 from an upper end part 44A to around a lower end part 44B concentrically. It is preferable that the heat collecting body 42, the containing pipe 43, the holder 44 and the cover 45 be composed of a metal material having heat resistance and oxidation resistance, for example, stainless steel.

Further, the movable body 41 includes a coil spring 46 that is contained in the interior of the holder 44 and that gives elastic force to the heat collecting body 42, the holder 44 and the cover 45 toward the upward side U relative to the fixed body 51. It is preferable that the coil spring 46 be composed of a material of stainless steels that has a high elastic coefficient.

The heat collecting body 42 has a flat contact surface 42A on the front surface, such that the contact surface 42A planarly contacts with the bottom surface 108 of the cookware 107.

The containing pipe 43 has an upper end part 43A formed in a flange shape. The upper end part 43A is joined to the back surface of the heat collecting body 42, for example, by welding. Thereby, in the containing pipe 43, the upper end part 43A side is closed, and a lower end part 43B is opened. In the interior of the containing pipe 43, the heat-sensitive body 11 of the heat-sensitive element 10 is contained. The heat-sensitive body 11 is contained in the containing pipe 43, such that the upper end part contacts with the back surface of the heat collecting body 42. It is preferable that the interior of the containing pipe 43 be filled with a filler for bridging the clearance with the heat-sensitive body 11. It is preferable that the filler contain a heat-resistant adhesive agent, particularly, a metal filler.

The holder 44 is a pipe-like member having a larger diameter than the containing pipe 43, and contains the containing pipe 43 and the heat-sensitive element 10 in the interior.

An upper end part 44A of the holder 44 is formed in a flange shape, and a circumference part of the heat collecting body 42 is folded over the whole circumference of the upper end part 44A of the holder 44. Thereby, in the holder 44, the side of the upper end part 44A is hermetically sealed by the heat collecting body 42, and therefore, even in the case of boiling over the cookware, the boiled soup does not come in the interior.

In the holder 44, a lower end part 44B having a smaller diameter is formed on the downward side L of a step part 44C. The step part 44C comes into contact with a metal washer 54, and thereby, a front end position of the movable body 41 is determined. The front end position herein is a first position when the movable body 41 has maximally advanced relative to the fixed body 51, and the movable body 41 is positioned at the first position, when no load is applied to the heat collecting body 42.

An upper end part 45A of the cover 45 is closed, and the inside forms a cylindrical void 45B. Further, a lower end part 45C of the cover 45 is opened.

An upper end part 45A of the cover 45 is pressed into the outer circumference of the upper end part 44A of the holder 44, and thereby, the cover 45 is fixed to the holder 44. Thus, the holder 44 and the cover 45 are fixed in a mutually liquid-tight state.

In the coil spring 46, an upper end part 46A thereof supports the back surface side of the heat collecting body 42, and a lower end part 44B supports an upper end part of an outer pipe 53 constituting the fixed body 51. The coil spring 46 applies the elastic force in the vertical direction between the fixed body 51 and the movable body 41.

The coil spring 46 has such an elastic force that the heat collecting body 42 is retracted to the downward side L and the contact of the heat collecting body 42 with the bottom surface of the cookware can be maintained when the cookware is placed on the cooking appliance.

[Fixed Body 51]

Next, the fixed body 51 will be described with reference to FIG. 1A, FIG. 1B, FIG. 2A, FIG. 2B, FIG. 4A and FIG. 4B.

After the temperature sensor 1 is attached to the cooking appliance, the position of the fixed body 51 is fixed even when the cookware is placed.

As shown in FIG. 1B and FIG. 4A, the fixed body 51 includes the outer pipe 53, and an inner pipe 55 provided on the inside of the outer pipe 53. The inner pipe 55 surrounds portions where the core wires 14 of the lead wires 13 are bared and portions where the core wires 31 of the connecting wires 30 are bared, with both of the portions face the connection portions 18. The portion where the core wire 14 is bared corresponds to the first exposed part in the invention of the application, and the portion where the core wire 31 is bared corresponds to the second exposed part in the invention of the application. Further, the inner pipe 55 corresponds to the deformation restricting element in the present invention.

In the outer pipe 53, an upper end part 53A projecting to the upward side U in a flange shape is formed, and the metal washer 54 is disposed on a lower surface of the upper end part 53A. The metal washer 54 is a cylindrical member that is fit to the outer circumference of the outer pipe 53. When the metal washer 54 is hit by the step part 44C of the holder 44, the metal washer 54 restricts a further movement of the movable body 41 to the forward side (upward side U).

It is preferable that the outer pipe 53 and the metal washer 54 be composed of the same metal material as that of the holder 44.

The inner pipe 55 restricts the amount of the deformation of the core wire 31 when the heat collecting body 42 receives the impact load.

The inner pipe 55 is a so-called two-hole tube including containing rooms 56 each of which passes in an axis direction C and is formed in a column shape as shown in FIG. 1B, FIG. 4A, FIG. 4B and FIG. 5. In the pair of containing rooms 56, 56, the diameters are set so as to be equal to each other. The diameter D is decided such that a gap is provided in the periphery of the lead wire 13 and the connecting wire 30. In each of the pair of containing rooms 56, 56, the lead wire 13 and the connecting wire 30 are contained together with the connection portion 18.

The inner pipe 55 is composed of an electrical insulating resin material. Therefore, even when the bared core wire 14 and core wire 31 come into contact, the short circuit with the inner pipe 55 does not occur. Further, in the inner pipe 55, a partition wall 57 for preventing the short circuit due to the contact of the core wires 14 and the core wires 31 is provided between the containing room 56 and the containing room 56.

[Motion of Temperature Sensor 1]

Next, the motion and action of the temperature sensor 1 will be described with reference to FIG. 2A, FIG. 2B, FIG. 4A, FIG. 4B, FIG. 5 and FIG. 8.

As shown in FIG. 2A, FIG. 2B and FIG. 8, when the cookware 107 is placed on the trivet 106 of the gas stove 100 to which the temperature sensor 1 is attached, the heat collecting body 42 abuts on the bottom surface of the cookware 107, and the movable body 41 moves to the downward side L, that is, retracts. At this time, as shown in FIG. 2B, the holder 44 and the cover 45 also retracts and stops against the elastic force of the coil spring 46 together with the heat collecting body 42. When the cookware 107 is carried away from the trivet 106 after the finish of the cooking, the heat collecting body 42, the holder 44 and the cover 45, by the elastic force of the coil spring 46, moves to the upward side U, that is, advances. As shown in FIG. 2A, the heat collecting body 42 and the like stop advancing when the step part 44C of the holder 44 comes into contact with the metal washer 54. In this way, in the temperature sensor 1, the movable body 41 holding the heat-sensitive body 11 reciprocates relative to the fixed body 51 disposed such that the position is fixed relative to the gas stove 100 that is a cooking appliance.

The reciprocation is performed between a first position and a second position. The first position is the position of the movable body 41 when the load has not been applied to the coil spring 46 because the cookware 107 has not been placed on the trivet 106. The second position is the position of the movable body 41 when the load has been applied to the coil spring 46 because the cookware 107 has been placed on the trivet 106. The coil spring 46 is an elastic body that applies elastic force to the movable body 41 from the second position toward the first position. The relative movement of the movable body 41 toward the first position is referred to as advancement, and the relative movement of the movable body 41 toward the second position is referred to as retraction.

When a rapid impact load is applied to the heat collecting body 42 and the impact load is received by the heat-sensitive element 10, there is a fear of the occurrence of the disconnection by which the electrical connection between the heat-sensitive body 11 and the lead wire 13 is released. FIG. 3B shows an example thereof, and tensile force acts on the core wire 14 of the lead wire 13 as shown by an arrow, so that the connection of the core wire 14 with the heat-sensitive body 11 by the electrode 12 is sometimes released. The heat-sensitive element 10 includes the protective layer 16, but the force by which the protective layer 16 keeps the connection of the core wire 14 by the electrode 12 is lower than the tensile force due to the impact load. Therefore, it is not possible to expect the prevention of the disconnection by the protective layer 16.

Hence, the temperature sensor 1 have requirements for relaxing the impact load with the core wire 31 of the connecting wire 30 instead of receiving the impact load only with the joining portion between the heat-sensitive body 11 of the heat-sensitive element 10 and the core wire 14. The requirements are that the core wire 31 is bared in an appropriate length on the rearward side of the connection portion 18 and the strength of the core wire 31 is lower than that of the core wire 14. Because of having the requirements, the core wire 31 elastically deforms antecedent to the disconnection of the core wire 14 from the heat-sensitive body 11, and thereby, it is possible to prevent the disconnection of the core wire 14.

A motion of the core wire 31 of the connecting wire 30 that receives the impact load will be described with reference to FIG. 4A, FIG. 4B and FIG. 5.

Figure 5:
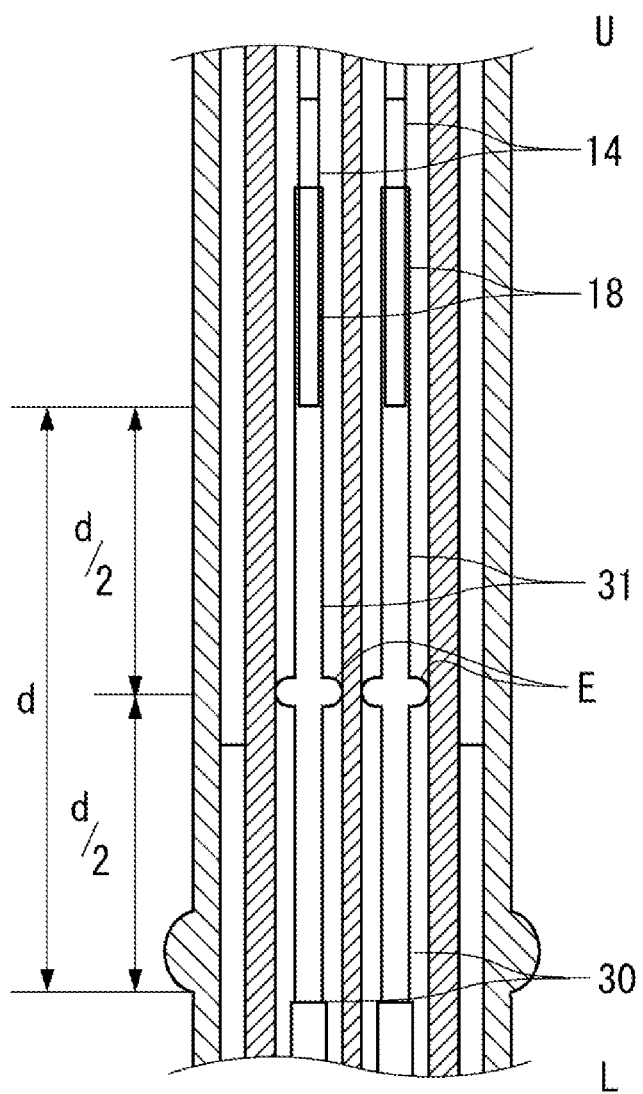
FIG. 5 is a partial enlarged view of FIG. 4B.

When the impact load is applied to the heat collecting body 42 in a no-load state shown in FIG. 4A, the lead wire 13 instantaneously retracts as shown in FIG. 4B and FIG. 5. Then, the core wire 31 on the downward side L of the connection portion 18 elastically deforms and expands toward the outside, so that a deformed part E is formed. Therefore, the core wire 31 relaxes the impact load. The portion of the core wire 31 that is covered with the insulating covering 33 has a higher strength than the bared core wire 31, and therefore, does not elastically deform.

Here, the impact load applied to the lead wire 13 and the connecting wire 30 through the heat collecting body 42 is the compressive load applied in the axis direction of the lead wire 13 and the connecting wire 30. Therefore, at the beginning of the receiving of the impact load, the lead wire 13 and the connecting wire 30 compressively deform, but become the deformed part E and bend toward to the outside in the radial direction when the received load excessively increases. This is regarded as a phenomenon that is known as the buckling of a post. In the first embodiment, the impact load is transformed into the deformation of the bared core wire 31 that is similar to the buckling, and thereby, the impact load is relaxed.

Here, a precondition of the buckling is that the load-directional size of a member to receive the compressive load is large. Therefore, in the first embodiment, the size of the bared core wire 31 in the axis direction C is long. As the knowledge of the inventors, when the size D of the bared portion on the rearward side of the connection portion 18 having a high strength is 5 mm or more, the deformed part E is generated easily, and when the size D is 10 mm or more, the deformed part E is generated more easily.

Further, there is a strong tendency that the deformed part E is generated at about the center of the size D of the bared portion as shown in FIG. 4B and FIG. 5. Therefore, the vicinity of about the center of the size D corresponds to the deformable region in the present invention.

Since the connecting wire 30 is constituted by a twisted wire, the above-described elastic deformation occurs on each conducting wire constituting the twisted wire. Each conducting wire has a smaller wire diameter than the core wire 14 of the lead wire 13. Meanwhile, the buckling occurs by a much lower force than the strength of the material, and therefore, the conducting wire constituting the twisted wire generates the deformed part E more easily than the core wire 14.

Here, when the diameter D (FIG. 4A and FIG. 4B) of the containing room 56 is small, the deformation amount of the deformed part E is small, and the impact load cannot be sufficiently relaxed. On the other hand, when the diameter D of the containing room 56 is larger than necessary, there is a fear that plastic deformation occurs beyond the elastic region and the brittle failure of the conducting wire constituting the twisted wire occurs. In consideration of them, the diameter D of the containing room 56 preferably is set in a range of 1.5-4 times the diameter of the core wire 31, and more preferably is set in a range of 2-3 times.

While the cooking is continued, that is, while the cookware 107 is placed on the trivet 106, the load of the cookware applied through the heat collecting body 42 is continuously applied to the lead wire 13 and the connecting wire 30, and therefore, the state of the elastic deformation of the core wire 31 is maintained. However, when the cookware is carried away from the trivet 106 after the finish of the cooking, the deformed portion is elastically restored and the core wire 31 is restored to the original straight state as shown in FIG. 4A. Herein, the elastic deformation has been described, but some of the plurality of conducting wires constituting the core wire 31 that is a twisted wire may plastically deform.

[Effect of Temperature Sensor 1]

In the temperature sensor 1, between the heat-sensitive element 10 and the connecting wire 30, the region having the lowest strength by being bared is provided on the core wire 31. Thereby, even when the heat collecting body 42 receives the impact load, the core wire 31 elastically deforms antecedently. Therefore, according to the temperature sensor 1, it is possible to prevent the disconnection of the core wire 14 from the heat-sensitive body 11 of the heat-sensitive element 10, even when the impact load is received.

Moreover, the temperature sensor 1 includes the inner pipe 55 that restricts the deformation amount of the core wire 31. Thereby, the plastic deformation of the core wire 31 is prevented, and the partition wall 57 of the inner pipe 55 prevents the short circuit due to the contact between the core wires 31.

Furthermore, in the temperature sensor 1, it is not necessary to provide a new member other than the inner pipe 55, for restricting the deformation amount of the core wire 31 and preventing the short circuit between the core wires 31. Moreover, although it is necessary to increase the size of the bared portion of the core wire 31, the machining man-hour does not change compared to a case where the bared portion is short. Consequently, according to the first embodiment, it is possible to provide the temperature sensor 1 having impact resistance, at little cost.

Modifications of First Embodiment

The first embodiment according to the present invention has been described above. The present invention is not limited to the first embodiment, and various modifications may be made.

First, in the temperature sensor 1, the inner pipe 55 formed of a two-hole tube is used as the element for restricting the deformation of the core wire 31, but the element for restricting the deformation of the core wire 31 in the present invention is not limited to this.

For example, a covering composed of silicone rubber and provided so as to cover the outer circumference surface of the core wire 31 constitutes the element for restricting the deformation of the core wire 31 in the present invention. Even when the covering is provided in the periphery of the core wire 31 with no clearance, the covering swells in the radial direction with the deformation of the core wire 31 and restricts the deformation of the core wire 31 because silicone rubber has a high flexibility.

Further, the element for restricting the deformation of the core wire 31 in the present invention is not limited to the above form of surrounding the periphery of the core wire 31. For example, since the core wire 31 is formed of a twisted wire, a gluing agent interposed among the plurality of conducting wires constituting the twisted wire can be used as the element for restricting the deformation of the core wire 31 in the present invention.

Next, in the first embodiment, the example in which the strength of the core wire 31 of the connecting wire 30 is lower than the strength of the core wire 14 of the lead wire 13 has been shown, but the strength of the core wire 14 of the lead wire 13 may be lower than the strength of the core wire 31 of the connecting wire 30. In this case, it is only necessary to cause the strength of the core wire 14 to be lower than that of the core wire 31 formed of a twisted wire by decreasing the diameter of the core wire 14. In this case, the portion of the core wire 14 that is bared elastically deforms.

Further, by adjusting the strength of the core wire 14 and the strength of the core wire 31, it is possible to deform both of the core wire 14 and the core wire 31 when the impact load is received.

Next, the gas stove 100 shown as the use purpose of the temperature sensor 1 is just an example of the present invention, and the application can be widely performed to appliances each of which contacts with a heating object and measures the temperature. For example, there are an electromagnetic cooker, a rice boiler, a pot, a coffee maker, and the like.

Further, the structure of the temperature sensor 1 also is just an example of the present invention, and the application is widely performed to temperature sensors each of which includes a movable body to reciprocate relative to a fixed body. As the materials of the members constituting the fixed body and the movable body, materials other than the materials shown in the first embodiment can be used. For example, for members in which metal materials are used, molded articles composed of resins can be used if the measurement temperature is low.

As for the above descriptions, the same goes for the second embodiment.

Second Embodiment

Next, a temperature sensor 2 according to the second embodiment of the present invention will be described.

The temperature sensor 2 is different from the temperature sensor 1 in the first embodiment, in that a core wire 61 elastically deforms in a covered range of an insulating covering 63. The temperature sensor 2 will be described below, mainly about the difference from the first embodiment. In the temperature sensor 2, the same constituent elements as those in the temperature sensor 1 are denoted by the same reference characters. Further, in the second embodiment, the core wire 61 corresponds to the second core wire in the invention of the application, the insulating covering 63 corresponds to the second insulating covering in the invention of the application, and the insulating covering 63 serves also as the deformation restricting element in the invention of the application.

[Configuration of Temperature Sensor 2]

Figure 7A:
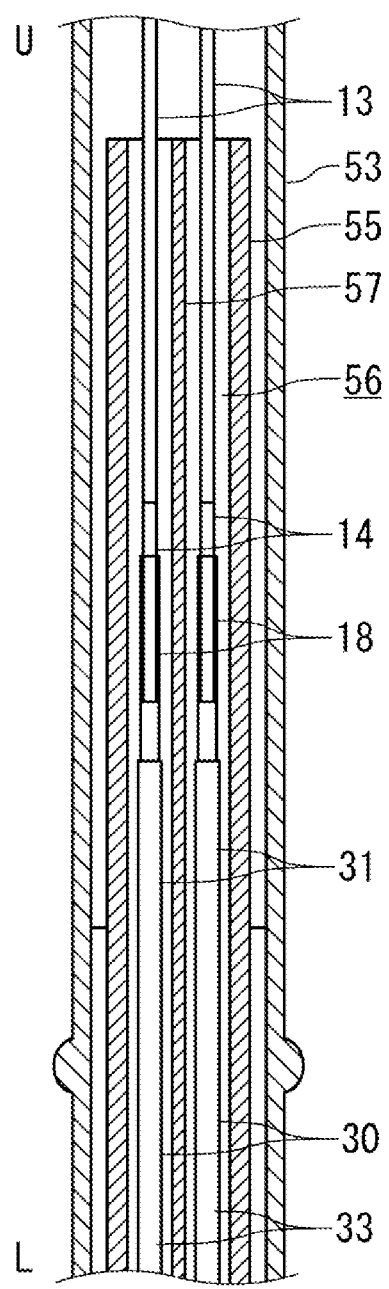
FIG. 7A, FIG. 7B, FIG. 7C and FIG. 7D each show a motion of the vicinity of joining portions between lead wires and connection electrical wires of the temperature sensor according to the second embodiment, FIG. 7A showing the no-load state where no cookware has been placed, FIG. 7B being a partial enlarged sectional view of FIG. 7A, FIG. 7C being a sectional view that corresponds to FIG. 7B when impact load has been applied by placement of the cookware on the cooking appliance, and FIG. 7D being a sectional view of a connection electrical wire according to the first embodiment that corresponds to FIG. 7B.

First, the temperature sensor 2 has the same external appearance as the temperature sensor 1, as shown in FIG. 6A, but is different in the form around the connection portions 18 between the core wires 14 and connecting wires 60, as shown in FIG. 6B and FIG. 7A. That is, in the temperature sensor 2, the insulating covering 15 and the insulating covering 63 are provided to positions close to the connection portion 18, and the ranges in which the core wire 14 and the core wire 61 are bared are reduced to minimum ranges that are necessary for the connections.

Next, the connecting wire 60 of the temperature sensor 2 is produced by a tape lapping method, unlike the connecting wire 30 of the temperature sensor 1. The tape lapping method is a production method for the connecting wire in which the insulating covering is formed by winding a tape made of a resin material around the outer circumference of the conducting wire and thereafter melting and solidifying the outer circumference of the tape. The inner circumference of the tape is not melted, and therefore, in the connecting wire 60 by the tape lapping method, the outer circumference surface of the core wire 61 and the inner circumference surface of the insulating covering 63 are hardly bonded mechanically. Moreover, since the outer circumference of the core wire 61 formed of a twisted wire has irregularities, minute clearances exist between the core wire 61 and the insulating covering 63. Therefore, the core wire 61 and the insulating covering 63 can be relatively displaced in the axis direction, and in the interior of the insulating covering 63, the core wire 61 can relatively move in the axis direction C and deform in the radial direction. The second embodiment relaxes the impact load using the characteristic of the connecting wire 60.

Here, for the connecting wire 30 by the extrusion method that is used in the first embodiment, the resin material composing the insulating covering 33 is extruded in the melted state from an extruder, while the core wire 31 receives the pressure from the outside toward the inside in the radial direction. Thereby, as shown in FIG. 7D, the insulating covering 33 invades into the irregularities on the outer circumference of the core wire 31, and therefore, in the connecting wire 30 by the extrusion method, the mechanical bonding strength between the core wire 31 and the insulating covering 33 is high compared to the connecting wire 60 by the tape lapping method.

[Action of Temperature Sensor 2]

As described above, in the connecting wire 60, the core wire 61 is bared only in a short range in the vicinity of the connection portion 18, and is difficult to elastically deform in the short range when the impact load is received. However, as described below with reference to FIG. 7B and FIG. 7C, the core wire 61 elastically deform at a portion of covering with the insulating covering 63.

Figures 7B, 7C:
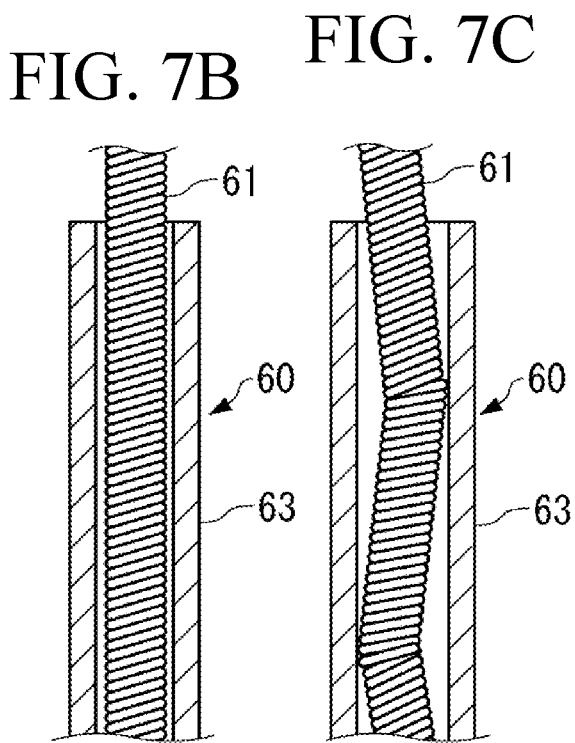
Figure 7D:
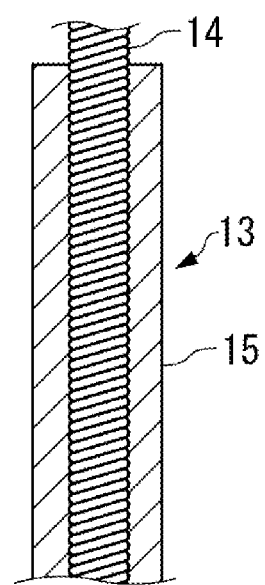

When the impact load acts on the heat collecting body 42 in the no-load state in FIG. 7B, the core wire 61 in the interior of the insulating covering 63 deforms so as to meander as shown in FIG. 7C, and thereby, the core wire 61 relaxes the impact load. The meandering deformation that occurs in the core wire 61 acts so as to extend the diameter of the insulating covering 63, but the insulating covering 63 restrains the meandering deformation.

Here, the axis-directional size of the portion of the core wire 61 that is not covered with the insulating covering 63 is small, and therefore, at this portion, the deformation similar to the buckling is hard to occur. Meanwhile, the reason why the deformation similar to the buckling in the first embodiment does not occur in the core wire 61 covered with the insulating covering 63 is inferred to be that the deformation amount peaks because the clearance between the core wire 61 and the insulating covering 63 is small and the peaked amount appears as the meandering deformation.

While the cooking is continued, the elastic deformation is maintained. However, when the cookware is carried away after the finish of the cooking, the deformed portion is elastically restored and the core wire 61 is restored to the original straight state as shown in FIG. 7B.

[Effect of Second Embodiment]

In addition to the same effect as the temperature sensor 1 according the first embodiment, the temperature sensor 2 according to the second embodiment exerts the following effect.

The core wire 61 meanders in an appropriate length, and thereby, the temperature sensor 2 can relax the impact load. Therefore, the durability of the core wire 61 is higher compared to the temperature sensor 1 that relaxes the impact load by the local deformation of the core wire 31. However, the production cost of the electrical wire by the extrusion method is lower than that of the electrical wire by the tape lapping method.

REFERENCE SIGNS LIST 1, 2 temperature sensor
10 heat-sensitive element
11 heat-sensitive body
12 electrode
13 lead wire
14 core wire
15 insulating covering
16 protective layer
18 connection portion
30 connecting wire
31 core wire
33 insulating covering
40 sensor holding body
41 movable body
42 heat collecting body
42A contact surface
43 containing pipe
44 holder
45 cover
46 coil spring
51 fixed body
53 outer pipe
54 metal washer
55 inner pipe
56 containing room
57 partition wall
60 connecting wire
61 core wire
63 insulating covering
100 gas stove
106 trivet
107 saucepan
108 bottom surface
C axis direction
E deformed part

The invention claimed is:

1. A temperature sensor comprising:
   a sensor element including a heat-sensitive body configured to contact with a detection object, a pair of lead wires connected with the heat-sensitive body, and connecting wires connected with the lead wires respectively; and
   a holding element including a fixed body configured such that a position of the fixed body is fixed to an object appliance, and a movable body configured to support the heat-sensitive body of the sensor element and to reciprocate between a first position and a second position relative to the fixed body, wherein
   each of the lead wires includes a first core wire formed of a solid wire,
   each of the connecting wires includes a second core wire formed of a twisted wire and a second insulating covering that covers the second core wire,
   a conducting wire constituting the twisted wire has a smaller wire diameter than the solid wire,
   the second core wire of each of the connecting wires includes a deformable region having a strength lower than that of the first core wire of each of the lead wires,
   each of the lead wires and each of the connecting wires are connected through a connection portion between a first exposed part where the first core wire is bared and a second exposed part where the second core wire is bared, and
   the deformable region is included in the second exposed part.

2. The temperature sensor according to claim 1, comprising
   a deformation restricting element configured to restrict a deformation amount of the second core wire and composed of an electrical insulating material.

3. The temperature sensor according to claim 2, comprising:
   an elastic body configured to apply elastic force to the movable body toward the first position.

4. The temperature sensor according to claim 2, wherein the deformation restricting element covers the first exposed part, the connection portion and the second exposed part from a periphery with a predetermined gap.

5. The temperature sensor according to claim 4, comprising:
an elastic body configured to apply elastic force to the movable body toward the first position.

6. A cooking appliance comprising the temperature sensor according to claim 2.

7. A cooking appliance comprising the temperature sensor according to claim 4.

8. The temperature sensor according to claim 1, comprising:
an elastic body configured to apply elastic force to the movable body toward the first position.

9. A cooking appliance comprising the temperature sensor according to claim 8.

10. A cooking appliance comprising the temperature sensor according to claim 1.

11. A temperature sensor comprising:
a sensor element including a heat-sensitive body configured to contact with a detection object, a pair of lead wires connected with the heat-sensitive body, and connecting wires connected with the lead wires respectively; and
a holding element including a fixed body configured such that a position of the fixed body is fixed to an object appliance, and a movable body configured to support the heat-sensitive body of the sensor element and to reciprocate between a first position and a second position relative to the fixed body, wherein
each of the lead wires includes a first core wire formed of a solid wire,
each of the connecting wires includes a second core wire formed of a twisted wire and a second insulating covering that covers the second core wire,
a conducting wire constituting the twisted wire has a smaller wire diameter than the solid wire,
each of the lead wires and each of the connecting wires are connected through a connection portion between a first exposed part where the first core wire is bared and a second exposed part where the second core wire is bared, and
each of the second core wires covered with the second insulating covering include a deformable region.

12. The temperature sensor according to claim 11, comprising:
an elastic body configured to apply elastic force to the movable body toward the first position.

13. The temperature sensor according to claim 11, wherein
in each of the connecting wires, the second core wire and the second insulating covering contact with each other, such that a relative movement in an extending direction of the lead wires can be performed.

14. A cooking appliance comprising the temperature sensor according to claim 13.

15. A cooking appliance comprising the temperature sensor according to claim 11.

* * * * *